Patented Nov. 28, 1950

2,531,825

UNITED STATES PATENT OFFICE 2,531,825

PAINT, VARNISH, AND LACQUER REMOVER

Edwin P. Peterson, Brooklyn, and Oscar P. Muller, New York, N. Y., assignors to National Lead Company, New York, N. Y., a corporation of New Jersey No Drawing. Application March 29, 1947, Serial No. 738,235

11 Claims. (Cl. 252—163)

This invention relates generally to bodied solvents and more particularly to solvents of the character adapted for softening and removal of coatings of the character of paint, varnish, lacquers and the like.

One of the objects of this invention is to provide a novel solvent.

Another object is to provide a process of making such a solvent.

Further objects will appear from the detailed description in which will be set out illustrative embodiments of this invention; it is to be understood, however, that this invention is susceptible of various embodiments within the scope of the appended claims.

Generally stated and in accordance with illustrative embodiments of this invention, the bodied solvent has colloidally dispersed therein a modified clay, originally exhibiting a substantial base-exchange capacity and in which the inorganic cation has been replaced by a substituted onium base of the character hereinafter described, in order to exhibit a substantial gelling characteristic in the solvent.

In accordance with a process embodying this invention, the modified clay is colloidally dispersed in the solvent so as to body the same.

The solvent may be any suitable organic liquid or combinations or mixtures of solvents which may be employed for various purposes, viz., to soften and facilitate the removal of paints, varnishes, lacquers and other coatings which it may be desired to remove.

When solvent mixtures are applied on the coatings such as paint, varnish, lacquers and the like, they spread to a thin film due to their low viscosity and are not suitable for removing such coatings from vertical surfaces. Furthermore, because of spreading rapidly into thin films, these solvents evaporate too rapidly to soften the coating and would have to be applied many times in order to be effective. In order to avoid these difficulties and to be able to apply the remover in a heavy film and to prevent the solvents from spreading excessively and running on vertical and inclined surfaces, it is customary to thicken the composition by means of various additives.

Many agents have been suggested and used for thickening paint removers and are mentioned in the literature, principally cellulose esters, wax compounds or combinations of both or metal soaps in the form of stearates. Such gelling agents are not volatile and constitute a residue after evaporation of the solvents which adversely affects the properties of coatings applied over them and must be removed more or less completely before new paint can be applied. Furthermore, in most cases it is difficult to form thixotropic gels heavy enough to prevent running or sagging on vertical surfaces. The incorporation of these agents into the solvent mixture requires special processing and in some cases the preparation of the gelling agents themselves are lengthy and time consuming.

The clays which are useful as starting materials for making the modified clay in accordance with this invention are those exhibiting substantial base-exchange properties, and particularly those exhibiting comparatively high base-exchange properties, and particularly those exhibiting comparatively high base-exchange properties and containing cations capable of more or less easy replacement. The clays particularly contemplated by the specification and the claims, include the montmorillonites, viz., sodium, potassium, lithium and other bentonites, particularly those of the Wyoming type; magnesium bentonite (sometimes called hectorite) and saponite; also nontronite and attapulgite, particularly that of the Georgia-Florida type. These clays, characterized by an unbalanced crystal lattice, are believed to have negative charges which are normally neutralized by inorganic cations. As found in nature, therefore, they exist as salts of the weak clay-acid with bases such as the alkali- or alkaline-earth metal hydroxides.

The base-exchange capacities of the various clays enumerated run from about 25 to about 100, based upon milliequivalents of exchangeable base per 100 grams of clay. The montmorillonites have comparatively high base-exchange capacities, viz., 60–100. Attapulgite has substantial base-exchange capacity, viz., 25–35. Generally, the clays of higher base-exchange capacities are particularly useful where high exchange of an organic base for the cation of the clay is desired.

More specifically, and in accordance with illustrative embodiments of this invention, a clay of the character described and exhibiting substantial base-exchange capacity, is reacted with an organic compound, more particularly one hereinafter generally defined and referred to as an "onium" compound, by the substitution, for the clay cation, of the cation of the organic compound, which cation is of a class hereinafter referred to as an "onium" base. This invention is not, however, restricted to the use of a reaction product of a base-salt with clay-salt, but includes the reaction product of a free base with an acid-clay.

An "onium" compound has been defined in Hackh's Chemical Dictionary, Second Edition, as:

"A group of organic compounds of the type $RXH_y$ which are isologs of ammonium and contain the element X in its highest positive valency, viz:

"Where X is pentavalent as in ammonium, phosphonium, arsonium, and stibonium; where X is tetravalent as in oxonium, sulfonium, selenonium and stannonium compounds; and where X is trivalent, as in iodonium compounds; and that they may be considered addition compounds of oxonium, carbonium, stibonium, cf., -inium, -ylium."

A number of the compounds capable of reacting with clays, particularly bentonite, will be described; it is to be understood, however, that various other compounds reactable with clays of the character described, may be employed. These compounds may include salts of aliphatic, cyclic, aromatic, and heterocyclic amines, primary, secondary, and tertiary amines and polyamines, also quaternary ammonium compounds, as well as other monobasic or polybasic onium compounds, such as triphenylalkyl phosphonium, or arsonium, or stibonium-halides, or dialkyl-, or diaryl-sulphonium and selenonium halides, and pyrones, such as 2,5-dimethyl gamma pyrone hydrochloride.

As previously mentioned, the untreated sodium bentonite in contact with water absorbs large quantities of the water and swells, forming a gel. This swelling has been attributed to the lamellar structure of the clay mineral and to adsorption of water molecules onto the surfaces of the mineral sheets, thus giving rise to a separation of the sheets as the oriented water layers build up to an appreciable depth. If the surfaces of the clay laminae contain organic matter, as by the reaction of base exchange with an organic base, the ability of water molecules to be adsorbed is eliminated, and the clay no longer exhibits its former swelling capacity in water. Thus Wyoming bentonite, for example, which is essentially the sodium salt of montmorillonitic acid, is capable of reacting with organic bases or their salts, e. g., 1. 
$C_{12}H_{25}NH_3{}^+$ bentonite$^-$ + Na$^+$OH$^-$ or more readily 2. 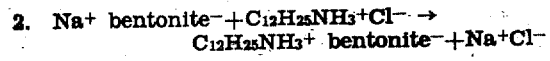
$C_{12}H_{25}NH_3{}^+$ bentonite$^-$ + Na$^+$Cl$^-$ The resulting dodecylammonium bentonite is visualized as consisting of clay mineral laminae with dodecylammonium groups fairly regularly distributed over the surfaces and attached by means of the substituted ammonium groups, with the hydrocarbon tails extending out over the crystal surfaces. Such a material is now organophilic rather than hydrophilic and as such exhibits in organic liquids some of the characteristics which the untreated clay exhibited in water; for example, it will swell in many organic liquids and will form stable gels and colloidal dispersions. Such gels are visually homogeneous and often transparent or translucent. They are thermally stable up to the boiling point of the liquid phase and show little tendency to flow or run when heated. The more dilute systems which are more or less liquid have viscosities much higher than those of the liquids themselves, and in most cases exhibit thixotropy characteristic of the analogous bentonite-water system.

The situation is analogous to the above if the element X of the onium compound is other than nitrogen. The onium compound should, however, be such that the resultant onium-bentonite will have substantial swelling properties in organic liquids. Such swelling characteristic may be determined by interoducing 2 grams of the onium-bentonite product into nitrobenzene and noting the amount of swelling in milliliters. Thus, in the case of amine-bentonite products, the employment of salts of alphatic amines, including the propyl, butyl and octylamines containing from 3 to 8 carbon atoms in an aliphatic chain will produce an amine-bentonite product showing a swelling of only from 5 to 7 ml. in nitrobenzene. There is, however, generally a distinct region of increase of swelling with amine-bentonites in which the amine has in excess of 10 carbon atoms in an aliphatic chain. Thus the swelling in nitrobenzene of corresponding amine-bentonites are found to be: decylamine-bentonite (10 carbon atoms), 36 ml.; dodecylamine-bentonite (12 carbon atoms), 50 ml., with this high swelling hold through the series, viz., octadecadienylamine-bentonite (18 carbon atoms), 50 ml., a like relation being generally found for other onium-bentonites. Such products may, therefore, well be called "high-swelling" onium-bentonites.

The ratio of the onium compound, such as, for example, an amine compound, to bentonite, may be varied within certain limits in converting the bentonite to the organophilic condition. In general, it is satisfactory to react the amine salt with the bentonite in the ratio of 100 milliequivalents of amine salt to 100 grams of bentonite, which is approximately the base-exchange capacity of the standard highly swelling sodium bentonites. In accordance with this invention, it is not necessary that the inorganic cation of the clay be completely replaced by the onium base; some of the objects and useful results of this invention may be attained by partial replacement. Typical values of swelling on the above basis are listed below for a series of dodecylammonium-bentonites, in which the ratio of amine to bentonite was varied over wide limits:

| Amine/bentonite: | 50 me./100 g. | 75/ | 100/ | 125/ | 150/ | 200/ | 300/ |
|---|---|---|---|---|---|---|---|
| Swelling in nitrobenzene; ml | 27.3 | | 43.0 | 65.3 | 47.5 | 30.0 | 20.5 | 15.5 |

This table indicates the wide range over which the amine-bentonite ratio can be varied, but it also shows the optimum effect exhibited at the theoretical base-exchange value for this combination.

For the most efficient use of organic base to obtain optimum gelling properties, it is therefore desirable either to select an onium compound such as an amine compound, which, when converted to the onium base form and reacted by base-exchange with the clay, are absorbed to certain points on the surface of the mineral, or to substitute the proper aliphatic chain in a polyammonium base. It has been found that a base with a molecular area of about 70 square angstrom units, for example, a primary amine with a chain of 10 carbon atoms, e. g., decylamine, will substantially fulfill the requirements of covering the clay surface. Other types of amines, however, may be used also, e. g., polyamines such as triethylenetetramine, aromatic amines such as naphthylamine, cyclic amines such as cyclohexylamine, heterocyclic amines, such as pyridine, secondary amines such as diamylamine, tertiary amines such as lauryl dimethyl amine and quaternary ammonium compounds such as tetra-ethanol-ammonium hydroxide. An excess of organic matter as occasioned by use of an amine of area greater than 70 square angstrom units, as for example octadecadienylamine, is not detrimental to the gelling properties of the amine-bentonite composition. Good results, for instance, have been obtained with primary amines having hydrocarbon chains of twelve or more carbon atoms.

The type of clay mineral to be used may vary with the intended use. For optimum gelling properties it is best to use a bentonite which exhibits good gelling properties in water. However, some non-swelling clays when converted to the onium salt form will swell in organic liquids and give rise to thixotropic colloidal dispersions.

It is to be understood that when reference is made to basic organic compounds such as amines, it is implied that before reacting with the clay by base-exchange, the amine is converted to the onium form either by the addition of acid or by reason of the fact that some part of the inorganic base in the naturally occurring clay consists of hydrogen.

In the preparation of organic gels various methods may be followed. If it is desired to prepare a gel free from abrasive impurities it may be advantageous to start with a dilute aqueous dispersion of bentonite and allow the non-bentonite impurities to settle out, or to remove them by supercentrifuging. By the latter method it is also possible to fractionate the clay into any desired particle size fraction. Thereafter, the purified bentonite dispersion is reacted with a salt of the desired amine or other basic organic compound. The flocculated onium bentonite is then filtered, dried, ground and mixed with the organic liquid which is to be bodied up. For rapidly accomplishing dispersion of the onium bentonite in the organic liquid, it is often advantageous to heat the mixture and pass it through a multiple-roll mill such as a paint mill, although this is not necessary for some combinations.

Where impurities associated with the clay are of no consequence, it is often sufficient merely to add the dry clay to the organic liquid containing sufficient amine salt or salts of other basic organic compound to more or less completely react with the clay. The gelling effect is thus enhanced by converting the amine to the salt form, or any of the other basic organic compounds to the onium form, either before or after the addition of the clay, by introduction of an acid such as hydrochloric or acetic acid. Further, it is also feasible to prepare a dry mixture, to be used in gel formation, by mixing the amine with dry clay and then mixing in the requisite amount of an acid such as acetic or by mixing the amine salt with the dry clay, thereafter adding the dry amine-bentonite mixture to the liquid with which it is desired to produce a gel.

Such gels vary in consistency (stiffness) depending on the amount of onium bentonite used and the type of solvent or mixture of solvents. The amount of onium bentonite added varies depending on the stiffness of the gel desired, but it was found that between 5 and 15 percent by weight of onium bentonite added to the solvents will produce satisfactory results.

The following examples are given to illustrate embodiments of the invention, but it will be understood that the invention is not limited to the specific examples given.

EXAMPLE 1

*Preparation of a modified clay gelling agent*

600 g. of a Wyoming bentonite was added to 18 liters of water and the slurry allowed to stand for two hours to settle out the non-clay impurities. 9.9 g. (0.1 mol) of 36% concentrated hydrochloric acid was added to 26.95 g. (0.1 mol) of octadecylamine, and the octadecylammonium chloride formed was then dissolved in three liters of hot water. The hot solution was added to 2924 ml. of the grit-free bentonite slurry. Flocculation of the bentonite occurred immediately upon addition of the hot amine salt solution, and the precipitate was filtered, washed, dried and pulverized. The product was reserved for furthere use.

EXAMPLE 2

*Preparation of a modified clay gelling agent*

119.4 g. of dry steam jet milled bentonite, containing 6.3% moisture and 10% non-clay impurities was weighed into a mortar. 18.52 g. (0.1 mol) of dodecylamine and 6.05 g. (0.1 mol) of glacial acetic acid were added and intimately mixed with a pestle until a homogeneous smooth powder resulted. The product was reserved for further use.

EXAMPLE 3

*Preparation of paint remover*

The following ingredients were mixed together:

| | Parts by weight |
|---|---|
| Methyl-isobutyl-ketone | 24.0 |
| Denatured ethyl alcohol | 24.5 |
| Toluol | 41.5 |
| Octadecyl-ammonium bentonite of Ex. 1 | 10.0 |
| | 100.0 |

The octadecylammonium bentonite prepared according to Example 1 and methyl-isobutyl-ketone, were mixed at room temperature into a homogeneous slurry and the remainder of the ingredients added. The product was successfully used as a lacquer remover.

EXAMPLE 4

The composition described in Example 3 was used, with the exception that the octadecylammonium bentonite of Example 1 was replaced by the dodecylammonium bentonite of Example 2. In preparing the composition, the solvents were first intermixed and then the dodecylammonium bentonite of Example 2 was added at room temperature and the mixture stirred. The resultant product was found by test to be suitable as a paint remover.

EXAMPLE 5

| | |
|---|---|
| Tetrahydronaphthalene | 40.0 |
| Benzol | 15.0 |
| Denatured ethyl alcohol | 10.0 |
| Butylacetate | 5.0 |
| Methylene dichloride | 20.0 |
| Dodecylammonium bentonite of Ex. 2 | 10.0 |
| | 100.0 |

In preparing this composition, the same procedure as described for Example 3 was followed, with the exception that tetrahydronaphthalene and dodecylammonium bentonite of Example 2 were made into a slurry and the other ingredients then added. The resultant product was successfully employed in the removal of an aged paint film. Further, the resultant product was successfully employed in the degreasing of an internal combustion engine which, in addition to the normal accumulation of grease from operation, had also been coated with grease to prevent rusting during a prolonged period of storage.

EXAMPLE 6

The same composition as mentioned under Example 5 was used with the exception that octadecylammonium bentonite of Example 1 was used in place of dodecylammonium bentonite of Example 2. In preparing this composition, all solvents were first mixed and then the octadecylammonium bentonite was added and the mixture stirred. The resultant product served satisfactorily as a paint-remover, and also as a varnish remover.

It is to be understood that the use of onium bentonites in paint, varnish and lacquer remover compositions is by no means limited to the examples above.

The octadecylammonium bentonite of Example 1 and the dodecylammonium bentonite of Example 2 may be replaced with other onium bentonites. As, for example, triphenyllaurylphosphonium bentonite, triphenylcetylphosphonium bentonite, dimethyldilaurylammonium bentonite, or onium bentonites of the class of arsonium, stibonium, etc., without departing from the scope of this invention. In order that the onium bentonite compound produce the desired bodying when added to solvents, it is felt that the onium compound should contain at least one alkyl group having a chain length of at least 8 carbon atoms. Maximum bodying is obtained with onium bentonite compounds containing an alkyl group having from 12 to 18 carbon atoms in the chain inclusive. Laurylammonium bentonite, stearylammonium bentonite, dimethyldilaurylammonium bentonite and triphenyllaurylphosphonium bentonite are examples of onium bentonites with superior bodying properties in common organic solvents and may be substituted in Examples 3, 4, 5 and 6 with satisfactory results.

Among the solvents suitable are all solvents or combinations thereof, provided such solvents have the ability to dissolve or swell coating films which one desires to remove.

Other solvents than those mentioned in the above examples may be used. They may replace all or part of the solvents mentioned. Among such solvents are ketones, other than methyl-isobutyl-ketone, acetone, methyl-ethyl-ketone, mesityl-oxide or diacetone alcohol. The amount used in a remover composition may be widely varied and if it is so desired, may form the sole liquid portion. Likewise other aromatic hydrocarbons may be substituted for toluol: benzol, hi-flash naphtha, coal tar naphtha or hydrogenated paraffin solvents with aromatic contents ranging from 20-92 percent are suitable. They may again be substituted for all or part of the toluol or may constitute the sole liquid portion if so desired. The same is true with respect to the use of other esters as replacements for butyl-acetate; for example, methyl, ethyl, isopropyl or amyl acetate or any of the glycol-ether acetates such as ethylene glycol monomethyl-ether acetate, or monoethyl, monobutyl-ether acetate or others may be employed. The alcohol portion can be replaced with methyl, isopropyl, propyl, butyl, amyl or octyl alcohol in part or fully, or can also constitute the sole liquid portion. Other chlorides may be used in place of methylene dichloride; for example, butyl chloride, ethylene dichloride, carbon tetrachloride, propylene dichloride or 1,1,2-trichlorethane may be employed.

A remover made according to this invention was found to adhere well to vertical surfaces. It remains as a covering of substantially uniform thickness over the entire surface on both the upper portion as well as lower portion. The active ingredients of the composition are held in contact with the coating for a time sufficient to completely soften the coating so that it may be easily removed by scraping.

Furthermore, the residue, or non-volatile portion from ammonium bentonite paint removers is not objectionable in its effect on the properties of paints, varnishes or lacquers applied over it. Paints, varnishes or lacquers applied over the residue from common type paint removers dry slower, are soft and have poor adhesion to the base. There is little effect from the residue of the removers made from the examples described above. This is an obvious advantage in that scrupulously thorough cleaning is not required before application of new paint, varnish or lacquer coats, and there is less danger of harmful effects when thorough cleaning is not possible.

Another advantage of this invention lies in the ease of preparation, whereby ammonium bentonites can be incorporated into the solvent blend by stirring by hand without the aid of machinery or other equipment. The system will gel within one hour to a gel of desirable consistency.

It will be readily understood that the above illustrative embodiments are to be broadly interpreted and not to be taken as limiting the scope of the invention claimed.

The invention having thus been described, what is claimed is:

1. A softener or remover for coatings, consisting essentially of an organic liquid of a generally coating penetrating and loosening character, having colloidally dispersed therein in an amount sufficient to substantially increase the viscosity thereof, a cation-modified clay, originally exhibiting a base-exchange capacity of at least 25 and in which the inorganic cation has been exchanged for an onium base of a type capable of and to an extent sufficient to form with the clay anion an onium-clay, 2 grams of which onium clay swelling to at least 16 milliliters in nitrobenzene.

2. A softener or remover for coatings, consisting essentially of an organic liquid of a generally coating penetrating and loosening character, having colloidally dispersed therein in an amount sufficient to substantially increase the viscosity thereof, a cation-modified bentonitic swelling clay, originally exhibiting a base-exchange capacity of at least 60 and in which the inorganic cation has been exchanged for an onium base of a type capable of and to an extent sufficient to form with the clay anion an onium-clay, 2 grams of which onium clay swelling to at least 28 milliliters in nitrobenzene.

3. A softener or remover for coatings, consisting essentially of an organic liquid of a generally coating penetrating and loosening character, having colloidally dispersed therein in an amount sufficient to substantially increase the viscosity thereof, a cation-modified clay, originally exhibiting a base-exchange capacity of at least 25 and in which the inorganic cation has been substantially replaced by an onium ammonium ion which has at least 10 carbon atoms in a straight aliphatic chain.

4. A softener or remover for coatings, consisting essentially of an organic liquid of a generally coating penetrating and loosening character, having colloidally dispersed therein in an amount sufficient to substantially increase the viscosity thereof, a cation-modified montmorillonite and in which the inorganic cation has been replaced by 50–300 ml. per 100 g. by an onium ammonium ion which has at least 10 carbon atoms in a straight aliphatic chain.

5. In the art of making a softener or remover for coatings, comprising treating an organic liquid of a generally coating-penetrating and loosening character and in an amount sufficient to substantially increase the viscosity of the organic liquid, with a cation-modified clay, originally exhibiting a base-exchange capacity of at least 25 and in which the inorganic cation has been exchanged for an onium base of a type capable of and to an extent sufficient to form with the clay anion an onium-clay, 2 grams of which onium clay swelling to at least 16 milliliters in nitrobenzene.

6. In the art of making a softener or remover for coatings, comprising treating an organic liquid of a generally coating-penetrating and loosening character with 5–15% of a cation modified clay, originally exhibiting a base-exchange capacity of at least 25 and in which the inorganic cation has been exchanged for an onium base of a type capable of and to an extent sufficient to form with the clay anion an onium-clay, 2 grams of which onium clay swelling to at least 16 milliliters in nitrobenzene.

7. A softener or remover for coatings consisting essentially of an organic liquid of a generally coating penetrating and loosening character, having colloidally dispersed therein in an amount sufficient to substantially increase the viscosity thereof, a cation-modified clay, originally exhibiting a base-exchange capacity of at least 25 and in which the inorganic cation has been exchanged for an onium base with an organic radical having a molecular area of at least 70 angstrom units, to an extent sufficient to form with the clay anion an organophilic clay.

8. A softener or remover for coatings consisting essentially of an organic liquid of a generally coating penetrating and loosening character, having colloidally dispersed therein in an amount sufficient to substantially increase the viscosity thereof, a cation-modified clay, originally exhibiting a base-exchange capacity of at least 25 and in which the inorganic cation has been exchanged for an ammonium base with an organic radical having a molecular area of at least 70 angstrom units, to an extent sufficient to form with the clay anion an organophilic clay.

9. A softener or remover for coatings consisting essentially of an organic liquid of a generally coating penetrating and loosening character, having colloidally dispersed therein in an amount sufficient to substantially increase the viscosity thereof, an organophilic swelling onium ammonium bentonite having a hydrophobic radical with a molecular area of at least 70 square angstrom units.

10. A softener or remover for coatings consisting essentially of an organic liquid of a generally coating penetrating and loosening character, having colloidally dispersed therein in an amount sufficient to substantially increase the viscosity thereof, an organophilic octadecyl ammonium bentonite.

11. A softener or remover for coatings consisting essentially of an organic liquid of a generally coating penetrating and loosening character, having colloidally dispersed therein in an amount sufficient to substantially increase the viscosity thereof, an organophilic dodecyl ammonium bentonite.

EDWIN P. PETERSON.
OSCAR P. MULLER.

REFERENCES CITED

The following references are of record in the file of this patent:

UNITED STATES PATENTS

| Number | Name | Date |
|---|---|---|
| 2,033,856 | Smith | Mar. 10, 1936 |
| 2,248,636 | Marsden | July 8, 1941 |
| 2,348,639 | O'Brien | May 9, 1944 |
| 2,388,082 | Roediger | Oct. 30, 1945 |

FOREIGN PATENTS

| Number | Country | Date |
|---|---|---|
| 215,880 | Great Britain | May 14, 1924 |

OTHER REFERENCES

Hauser et al.: "Color Reactions Between Clays and Amines," July 1940. Presented before the Colloid Division, American Chemical Society, Cincinnati, Ohio, April 9, 1940. Contribution from the Department of Chemical Engineering of the M. I. T., pages 1811–1814, vol. 62.